2,780,358

METHOD FOR INCREASING CAPACITY OF A POROUS ADSORBENT FOR LIQUID PHASE EXCHANGE ADSORPTION

Max A. Mosesman and Albert T. Watson, Baytown, Tex., assignors, by mesne assignments, to Esso Research and Engineering Company, Elizabeth, N. J., a corporation of Delaware No Drawing. Application December 29, 1953, Serial No. 401,062

4 Claims. (Cl. 210—42.5)

This invention is directed to a method for increasing the capacity of a body of porous adsorbent for liquid phase exchange adsorption.

The use of porous adsorbents for liquid phase exchange adsorption is well known to the art. Descriptions of such processes are found, for example in Lipkin, U. S. Re. 23,005, Lipkin, U. S. 2,398,101, Hirschler, U. S. 2,441,572, and Hirschler, U. S. 2,448,489.

The present invention is directed to an improved method for increasing the adsorptive capacity of a body of porous adsorbent for liquid phase exchange adsorption of hydrocarbons.

The adsorbent treated in accordance with the present invention may be any of well known porous adsorbents capable of liquid phase adsorptive separation of hydrocarbons. Examples of suitable solid adsorbents which may be employed are silica gel various activated clays such as alumina or bauxite and activated carbon such as activated coconut charcoal, activated bituminous carbon or petroleum coke. A detailed description and detailed examples of suitable adsorbents will not be given since such adsorbents and the use thereof are well known to the art.

The normally liquid hydrocarbon used for treating the adsorbent must be a material whose vapors are adsorbed by the adsorbent body and which is miscible with the liquid to be contacted with the body of adsorbent after its pretreatment. In general, it will be found that $C_{12}$ hydrocarbons or the maximum gasoline boiling range are the highest boiling hydrocarbons which should be employed for carrying out the pretreating step. Specific examples of suitable materials which may be employed are benzene, toluene, pentane, hexane and heptanes. It will be understood that these hydrocarbons may be used either alone or in admixture. For example, a light naphtha fraction or gasoline or mixtures of aromatic fractions boiling no higher than about 425° F. may be used for this purpose.

The method of the present invention is carried out by reducing the atmospheric pressure on the body of porous adsorbent to a value within the range of about 0 to 25 mm. of mercury. Vapors of the selected hydrocarbon or selected mixture of hydrocarbons are then brought into contact with the body of adsorbent in increments of pressure increases, said pressure increase increments being within the range of 1 to 10% of the normal vapor pressure of the hydrocarbon or hydrocarbon mixtures at the temperature of the adsorbent. At each increment of pressure increase, vapors and the body of adsorbent are allowed to reach equilibrium before proceeding to the next higher increment of pressure. This procedure is continued until the pressure of the vapors of hydrocarbon or hydrocarbon mixture in contact with the body of adsorbent is approximately equal the vapor pressure of the hydrocarbon at the temperature of adsorption. After this pretreatment step, the pretreated adsorbent is then ready to be used as the solid adsorbent for liquid phase exchange adsorption. This is carried out by bringing the pretreated body of adsorbent into contact with the hydrocarbon mixture which is to be separated into fractions by liquid phase exchange adsorption. As previously explained the hydrocarbon or hydrocarbon mixture used for pretreating the solid adsorbent must be miscible with the hydrocarbon mixture which is to be fractionated by liquid phase exchange adsorption.

By way of specific example, silica gel may be first evacuated to a low pressure of the order of $10^{-5}$ mm. Hg at room temperature. Vapors of n-hexane may then be brought into contact with the gel with incremental increases in the pressure no greater than about 12 mm. or about 10% of the vapor pressure of n-hexane at room temperature until the pressure of the n-hexane in contact with the silica gel equals the vapor pressure of n-hexane at room temperature. The pretreated gel may then be used in a liquid phase exchange adsorption as by percolating a close boiling mixture of benzene and saturated hydrocarbons through the gel followed by a mixture of xylenes which may be in admixture with $C_8$ paraffins, the benzene being displaced by the xylenes and subsequently being recovered therefrom by distillation.

As another specific example, silica gel at a temperature of approximately 69° C. is evacuated to a low pressure and vapors of benzene are then brought into contact with the gel with incremental increases in pressure, the incremental increases being within the range of 30 to 50 mm. Hg at 69° C. This presaturated silica gel may then be used in a liquid phase exchange adsorption as by percolating a mixture of xylenes through the silica gel followed by benzene-heptane solution to separate the benzene therefrom.

It is postulated in explanation of the improvement achieved by this invention, that the pores of the adsorbent initially are occupied by air and that liquids present in the hydrocarbon mixture to be separated by liquid phase exchange adsorption can block pores of the adsorbent and thereby imprison air in the pores which reduces the volume adsorbed by the solid adsorbent. It is postulated that when following the method of the present invention where the solid adsorbent and hydrocarbon vapor are first equilibrated at a low pressure of the hydrocarbon vapor and then the pressure increased in small increments so as to attain equilibrium at each pressure level, the entire pore volume of the solid adsorbent becomes filled with liquid due to capillary condensation. This results in a substantially greater amount of adsorption per volume of solid adsorbent than can be obtained if the pretreatment method of the present invention is not employed.

We claim:

1. In a process for separating a hydrocarbon mixture into fractions by liquid phase exchange adsorption, the improvement which comprises the steps of reducing the atmospheric pressure on a body of dry adsorbent to an amount within the range of 0 to 25 mm. of mercury, introducing vapors of a normally liquid hydrocarbon which is miscible with said hydrocarbon mixture and which has no more than about 12 carbon atoms per molecule into contact with said body of adsorbent in increments of pressure increase within the range of 1 to 10% of the vapor pressure of said hydrocarbon at the temperature of said body of adsorbent, allowing the body of adsorbent and hydrocarbon vapors to reach equilibrium at each increment of pressure increase before proceeding to the next increment of pressure increase and continuing until the pressure of the vapors of the normally liquid first hydrocarbon over the body of porous adsorbent is substantially equal to the normal vapor pressure of said hydrocarbon at the temperature of said body of adsorbent contacting the thus treated adsorbent with said hydrocarbon mixture to effect fractionation of the same and recovering a thus-prepared fraction.

2. A method in accordance with claim 1 in which said normally liquid hydrocarbon is hexane and in which said porous adsorbent is silica gel.

3. A method as in claim 1 wherein the porous adsorbent is silica gel, wherein the normally liquid hydrocarbon is hexane, wherein the hydrocarbon mixture comprises benzene and saturated hydrocarbons and wherein the adsorbent is contacted with a liquid hydrocarbon comprising a mixture of xylenes subsequent to the hydrocarbon mixture contact step.

4. A process as in claim 1 wherein the porous adsorbent is silica gel, wherein the normally liquid hydrocarbon is benzene, wherein the hydrocarbon mixture comprises benzene and heptane and wherein a mixture of xylenes is brought into contact with the treated adsorbent prior to bringing the benzene-heptane mixture into contact therewith.

References Cited in the file of this patent

UNITED STATES PATENTS

| 2,266,719 | Buxton | Dec. 16, 1941 |
| 2,464,311 | Hiatt et al. | Mar. 15, 1949 |
| 2,487,804 | Hermanson | Nov. 15, 1949 |
| 2,643,972 | Weedman | June 30, 1953 |

OTHER REFERENCES

Lewis et al.: Ind. & Eng. Chem., vol. 42, pages 1327–1331 (1950).

Hibshman: Ind. & Eng. Chem., vol. 42, pages 1310–1314 (1950).